(12) United States Patent
Uematsu

(10) Patent No.: US 6,334,186 B1
(45) Date of Patent: Dec. 25, 2001

(54) METHOD OF READING, ENCRYPTING AND TRANSFERRING DATA

(75) Inventor: Fumiaki Uematsu, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/198,574

(22) Filed: Nov. 24, 1998

(30) Foreign Application Priority Data

Apr. 14, 1998 (JP) .................................................. 10-102703

(51) Int. Cl.$^7$ ........................................................ G06F 1/24
(52) U.S. Cl. ............................ 713/168; 713/151; 713/161
(58) Field of Search ..................................... 380/200, 210; 705/51; 713/168, 161

(56) References Cited

U.S. PATENT DOCUMENTS 6,173,115 * 1/2001 Willis ..................................... 386/125

* cited by examiner

Primary Examiner—Thomas R. Peeso
(74) Attorney, Agent, or Firm—Armstrong, Westerman, Hattori, McLeland & Naughton, LLP

(57) ABSTRACT

A digital video disk controller for reading data from an optical disk and stores the data in a memory. The data is then read from the memory and encrypted by an arithmetic processor. The encrypted data is then transmitted directly to an external device, via an interface circuit, without first storing the encrypted data back into the memory. The number of memory accesses performed by the controller is thus reduced, providing for lower power dissipation and faster access to the read data.

6 Claims, 4 Drawing Sheets

METHOD OF READING, ENCRYPTING AND TRANSFERRING DATA

BACKGROUND OF THE INVENTION

1. Field of the Invention

The present invention relates to a method of data transfer, and, more particularly, to an apparatus and a method of reading, encrypting, and transferring data read from a recording medium to an external device.

2. Description of the Related Art

Providing digital storage media, such as digital video disks (DVD), with copy protection mechanisms for protecting copyrighted data has become increasingly important It is desirable that a signal processor performing copy protection functions be implemented using a single chip processor. The signal processor must perform quantitative arithmetic processing, such as encryption, on the data read from the storage medium. The processed data is then transferred to an external unit or device, such as a personal computer. It would be advantageous to increase the speed of processing and transferring the data read from the recording medium to the personal computer.

FIG. 1 is a block diagram of a conventional DVD unit 50. Specifically, the DVD unit 50 for reading an optical disk 51 serving as a recording medium comprises: a DVD controller 53 which functions as a signal processor, a memory (DRAM) 54 which provides a temporary storage space for data read from the optical disk 51, and a micro processing unit (MPU) 55 which controls the signal processing operation of the DVD controller 53. The DVD controller 53 reads data recorded on the optical disk 51 and applies quantitative arithmetic processing or encryption processing on the data before it is transferred to an external unit such as a personal computer 52.

Specifically, the DVD controller 53 comprises an error correction circuit 58, an encryption circuit 56 for encrypting the data read from the optical disk 51 and stored in the DRAM 54, and an external interface (I/F) circuit 57 for enabling data communication with the personal computer 52. The encryption circuit 56 comprises a cipher generator circuit 56a and an encryption arithmetic circuit 56b, which uses cipher data generated by the cipher generator circuit 56a to apply an arithmetic operation on the data read from the DRAM 54 and stores the processed data back in the DRAM 54 as encrypted data.

The DVD controller 53 also transfers the encrypted data stored in the DRAM 54 to the personal computer 52 through the interface circuit 57. The personal computer 52 then decodes the encrypted and transferred data to recover the data read from the optical disk 51.

As a result of the ever increasing processing speeds of personal computers, there is a demand imposed on the DVD controller 53 to decrease the processing time required to read and encrypt the data read from the optical disk 51.

However, the processing operation for the encryption requires:

(1) transferring the data stored in the DRAM 54 to the encryption circuit;

(2) transferring the encrypted data from the encryption circuit to the DRAM 54; and (3) transferring the encrypted data stored in the DRAM 54 to the interface circuit 57.

Thus, the DVD controller 53 must perform three accesses to the DRAM 54, which stands in the way of achieving a higher rate of data throughput.

It is an object of the present invention to provide a data transfer method and a signal processor which enable a high rate of data transfer.

SUMMARY OF THE INVENTION

To achieve the above objective, the present invention provides a data transfer method consisting essentially of the steps of: successively reading data to be transferred which is stored in a memory; applying quantitative signal processing to the read data; and transferring the processed data directly to an external unit.

The present invention further provides a signal processor, comprising: a memory for storing data to be transferred; an arithmetic circuit for successively receiving data to be transferred from the memory and successively applying signal processing to the data using quantitative data; and an interface for receiving the processed data directly from the arithmetic circuit and for successively transferring the processed data to an external unit.

The present invention provides a signal processor, comprising: a memory for storing data to be transferred; an encryption arithmetic circuit for successively receiving the data to be transferred from the memory and for successively encrypting the data using cipher data to produce encrypted data; and an interface for receiving the encrypted data directly from the encryption arithmetic circuit and successively transferring the encrypted data to an external unit.

The present invention further provides a digital video disk unit for reading data recorded in an optical disk, comprising: a memory for storing data to be transferred which is read from the optical disk; a signal processor for processing the data to be transferred; and a control unit for controlling the signal processor, wherein the signal processor comprises: an encryption arithmetic circuit which successively receives the data to be transferred from the memory and successively encrypts the data using cipher data to produce encrypted data; and an interface which receives the encrypted data directly from the encryption arithmetic circuit and successively transfers the encrypted data to an external unit.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
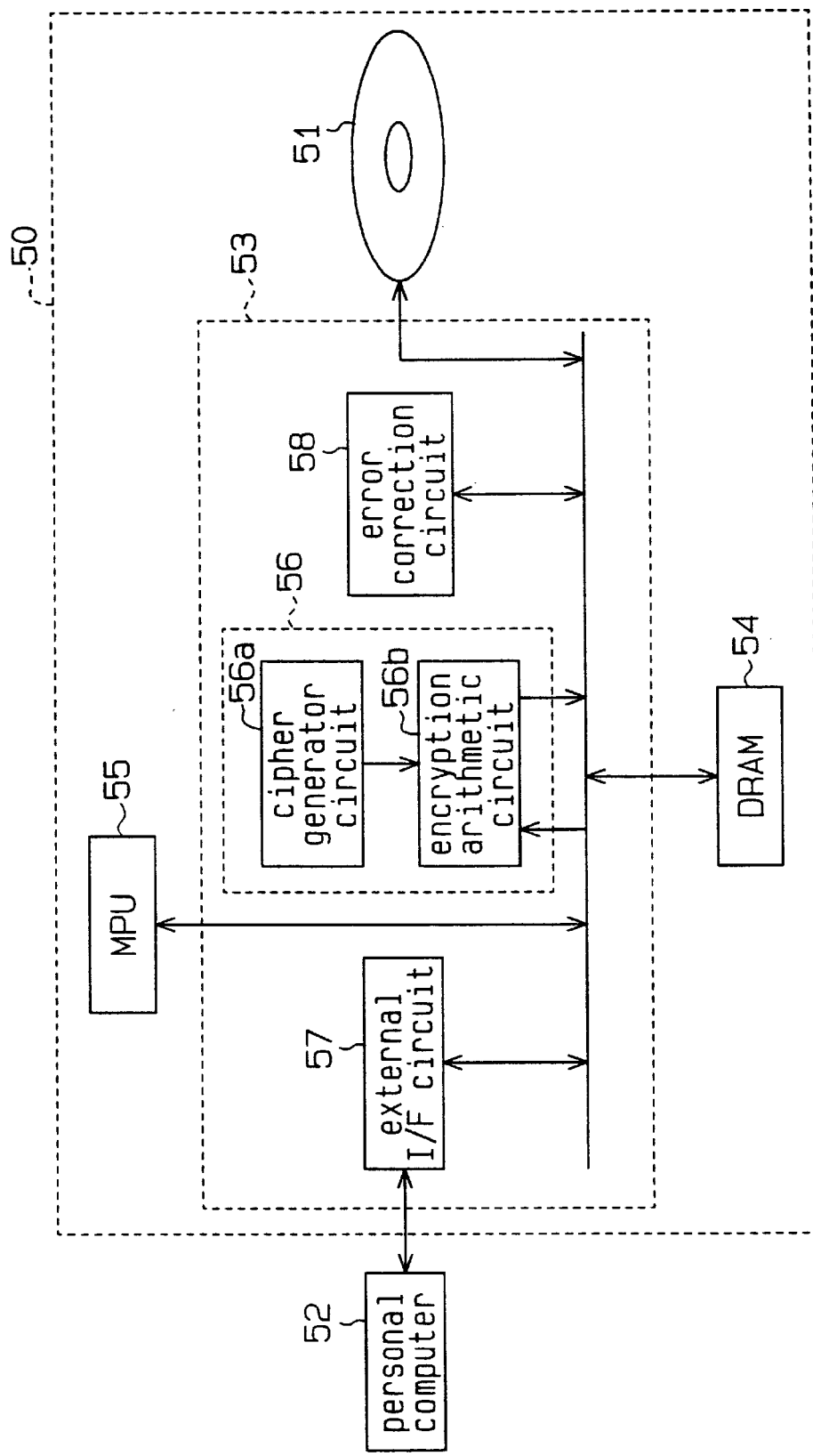
FIG. 1 is a schematic block diagram of a conventional DVD unit.

In the drawings, like numerals are used for like elements throughout.

Figure 2:
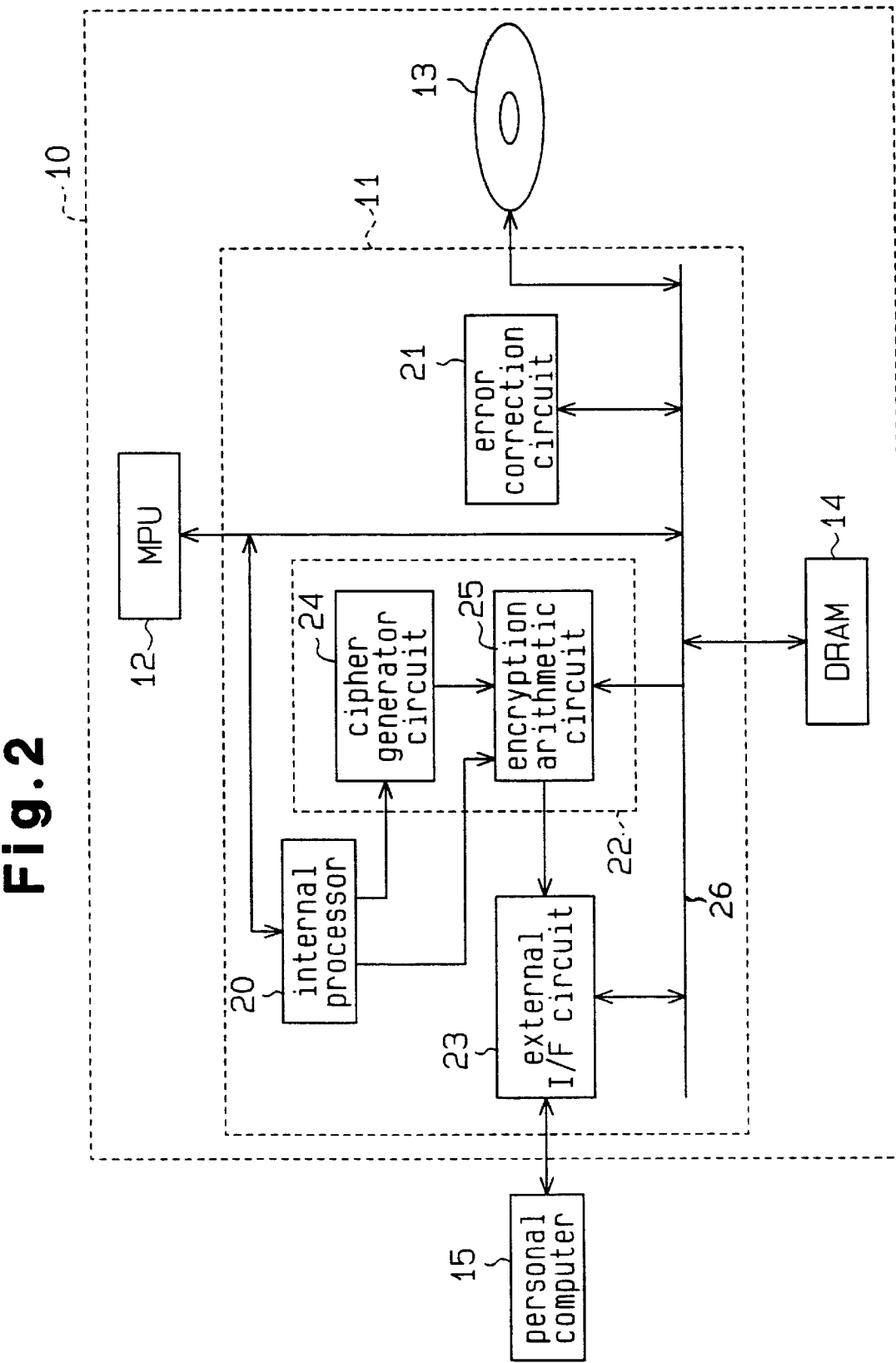
FIG. 2 is a schematic block diagram of a DVD unit according to a first embodiment of the present invention.

Referring to FIG. 2, a DVD unit 10 according to a first embodiment of the present invention will be described. An essential part of the DVD unit 10 is a signal processor, or DVD controller 11 for performing a copy protect function or performing the arithmetic operation for encryption. The DVD unit 10 comprises a micro processing unit (MPU) 12, a rotation controller (not shown) which controls the rotation of an optical disk 13, a drive head controller (not shown) which controls a drive head (not shown) used to read data from or write data to the optical disk 13, and a motion controller (not shown) which moves the drive head in the radial direction. The MPU 12 controls the transfer of control signals between the rotation controller, the drive head controller and the motion controller for performing data read and write operations with respect to the optical disk 13.

The DVD unit 10 further comprises a readable and writable dynamic random access memory (DRAM) 14, which is formed by a single chip semiconductor memory and which acts as a temporary storage of data read from the optical disk 13 and data to be written to the optical disk 13.

The DVD controller 11, is preferably also formed by a single chip semiconductor integrated circuit. The DVD controller 11 communicates with the MPU 12 via control signals. In response to control signals from MPU 12, the DVD controller 11 processes data read from the optical disk 13 by the drive head, and transfers the processed data to an external unit, such as a personal computer 15.

The DVD controller 11 comprises an internal processor 20, an error correction circuit 21, an encryption circuit 22, and an external interface (I/F) circuit 23. Each of the circuits 20 to 23 is interconnected with each other through a bus 26. The internal processor 20 communicates via a control signal with the MPU 12, and controls the controller 11 on the basis of the control signal from the MPU 12 to read encrypted data stored on the optical disk 13 and transfer the encrypted data to the personal computer 15. More particularly, data is read from the disk 13 and stored in the DRAM 14.

In response to a control signal from the internal processor 20, the error correction circuit 21 receives data which has been read from the optical disk 13 and stored in the DRAM 14, and checks for errors in the received data. If there is an error in the received data, the error correction circuit 21 corrects the data, and stores it back in the DRAM 14, to provide corrected data.

The encryption circuit 22 comprises a cipher generator circuit 24 and an encryption arithmetic circuit 25. The cipher generator circuit 24 generates cipher data used to encrypt the data to be transferred to the personal computer 25. The cipher generator circuit 24 is controlled by the internal processor 20, and provides the cipher data to the encryption arithmetic circuit 25, when instructed by the internal processor 20.

The internal processor 20 also controls the encryption arithmetic circuit 25, which successively receives the error corrected data stored in and read from the DRAM 14 (hereafter referred to as "data to be transferred") and the cipher data from the cipher generator circuit 20. The encryption arithmetic circuit 25 applies a given arithmetic operation or encryption algorithm on the transferred data using the cipher data to produce encrypted data (which is to be transferred), which is sequentially transmitted to the interface circuit 23.

The internal processor 20 is also capable of initiating transferring of data directly from the DRAM 14 to the personal computer 15 via the interface circuit 23 without applying encryption to the data, in response to a control signal from the MPU 12. In this instance, the cipher generator circuit 24 is not instructed to produce cipher data by the internal processor 20 and the encryption arithmetic circuit 25 successively supplies the data from the DRAM 14 to the interface circuit 23 without performing any encryption processing. Alternatively, the data may be read from the DRAM 14 and transferred to the interface circuit 23 over the bus 26.

The interface circuit 23 receives encrypted data or non-encrypted data from the encryption arithmetic circuit 25, and sequentially delivers it to the personal computer 15. The interface circuit 23 also functions to receive data from the personal computer 15 and transfer it to the DRAM 14.

The operation of the DVD controller 11 will now be described terms of the flow of data through the controller 11.

The MPU 12 communicates with the internal processor 20 to initiate the transferring of data from the DVD controller 11 to the personal computer 15. First, data is read from the optical disk 13 and stored in the DRAM 14. The data stored in the DRAM 14 is then transferred to the error correction circuit, by way of the bus 26. The error correction circuit 21 performs error detection and correction on the data using such methods as are known by those of ordinary skill in the art. The error corrected data is then stored back in the DRAM 14. Next, the data is transferred to the encryption arithmetic circuit 25, which encrypts the data using cipher data generated by the cipher generation circuit 24. Data encryption algorithms are well known by those of ordinary skill in the art and thus, the particular encryption algorithm used need not be discussed in detail in order to understand the present invention. After the data has been encrypted, the encryption arithmetic circuit 25 transfers the encrypted data directly to the external interface circuit 23, which in turn transfers the encrypted data to the personal computer 15. The encrypted data transferred to the personal computer 15 may be decoded by the personal computer 15 in order to recover the original data read from the optical disk 13.

As discussed above, the data stored in the DRAM 14 is encrypted by the encryption arithmetic circuit 15 and then immediately transferred to the personal computer 15 via the external interface circuit 23. That is, the encrypted data is not first stored back into the DRAM 14 before being transferred to the personal computer 15. This saves two DRAM 14 accesses, a write access to write the encrypted data to the DRAM 14 and a read access to read the encrypted data out of the DRAM 14 to transfer it to the personal computer 15. Thus, the present embodiment increases the speed at which data is read and transferred from the optical disk 13 to the personal computer 15. Further, a reduction in the number of DRAM 14 accesses also reduces power consumption.

Figure 3:
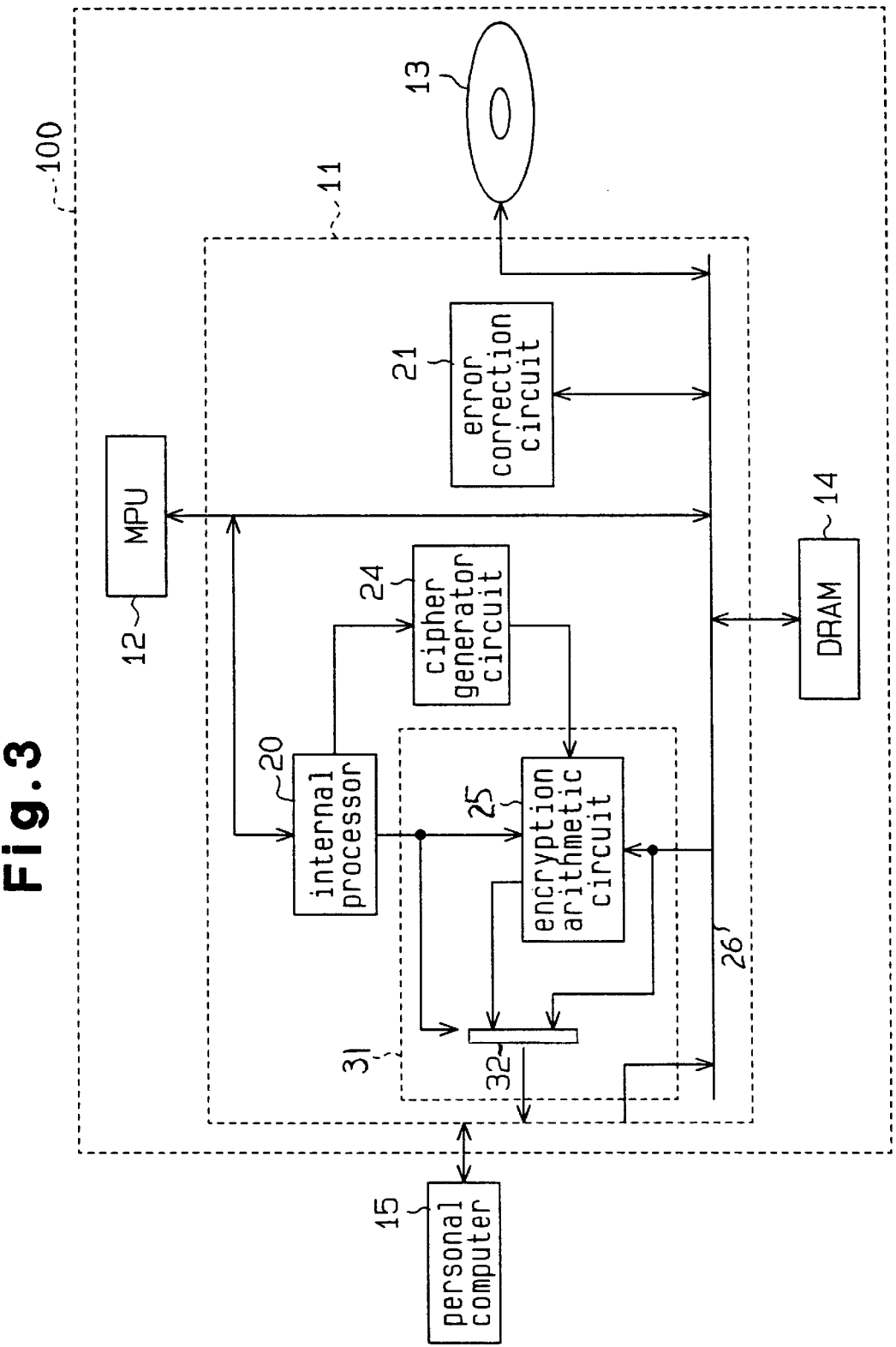
FIG. 3 is a schematic block diagram of a DVD unit according to a second embodiment of the present invention.

Referring to FIG. 3, a DVD unit 100 according to a second embodiment of the present invention will now be described. The DVD unit 100 differs from the DVD unit 10 of the first embodiment in that an interface circuit 31 internally contains the encryption arithmetic circuit 25.

As shown in FIG. 3, the interface circuit 31 comprises the encryption arithmetic circuit 25 and a selector 32. In response to a control signal from the internal processor 20, the encryption arithmetic circuit 25 receives data stored in the DRAM 14 and cipher data from the cipher generator circuit 24, and encrypts the data using the cipher data, thus producing encrypted data, which is then sequentially delivered from the encryption arithmetic circuit 31 to the selector 32.

The selector 32 receives the encrypted data from the encryption arithmetic circuit 31, and also sequentially receives data directly from the DRAM 14. In response to a control signal from the internal processor 20, the selector 32 selects either the encrypted data or the data from the DRAM 14, and transfers the selected data to the personal computer 15.

It is to be noted that the interface circuit 31 also functions to receive data from the personal computer 15 and deliver it to the DRAM 14.

The data flow in the DVD unit 100 will now be described. When encrypted data is to be transferred from the DVD unit 100 to the personal computer 15, the internal processor 20 controls the cipher generator circuit 24, the encryption arithmetic circuit 31 and the selector 32 via various control signals.

The encryption arithmetic circuit 31 sequentially receives the data read from the DRAM 14, and encrypts the data using the cipher data from the cipher generator circuit 24, thereby producing the encrypted data, which is delivered to the selector 32. In response to a selector control signal, the selector 32 selects the encrypted data, and transfers it to the personal computer 15.

In contrast, when the data stored in the DRAM 14 is to be transferred to the personal computer 15, without utilizing encryption, the internal processor 20 delivers control signals to the cipher generator circuit 24, the encryption arithmetic circuit 25 and the selector 32, which indicate that encryption is unnecessary. In accordance with these control signals, both the cipher generator circuit 24 and the encryption arithmetic circuit 25 cease their operation for purpose of encryption. The selector 32 selects the data read from the DRAM in accordance with the control signal applied thereto, and then transfers it to the personal computer 15.

With the DVD unit 100 of the second embodiment, the data is transferred to the personal computer 15 through the selector 32 immediately upon encryption, thus achieving a similar effect to that achieved by the DVD unit 10 of the first embodiment.

A DVD unit according to a third embodiment of the present invention will now be described with reference to FIG. 4. The third embodiment differs from the second embodiment in the provision of a plurality of encryption arithmetic circuits 25a–c in its interface circuit 33.

Figure 4:
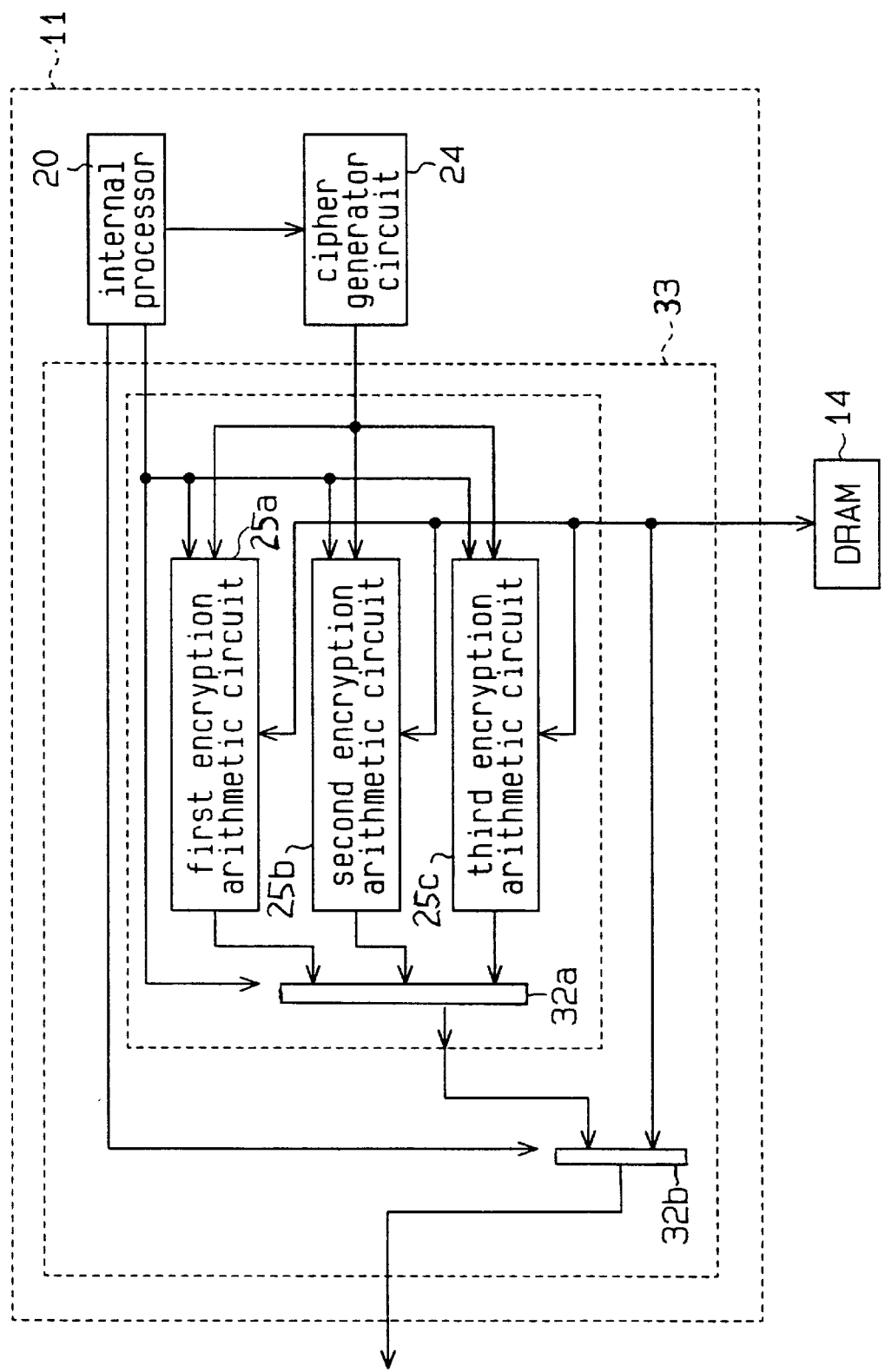
FIG. 4 is a schematic block diagram of a DVD unit according to a third embodiment of the present invention.

As shown in FIG. 4, the interface circuit 33 comprises a first, a second and a third encryption arithmetic circuit 25a, 25b and 25c, and first and second selectors 25a, 25b. Each of the encryption arithmetic circuits 25a to 25c receives mutually distinct cipher data from the cipher generator circuit 24. In addition, each of the encryption arithmetic circuits 25a–c receives data read from the DRAM 14. Specifically, one of the encryption arithmetic circuits 25a–c is selected by a control signal from the internal processor 20 to perform the encryption. The cipher generator circuit 24 then delivers cipher data which corresponds to one of the encryption arithmetic circuits 25a–c selected by the internal processor 20. In this manner, the selected encryption arithmetic circuit 25a–c encrypts the data using the cipher data, thus delivering encrypted data to be transferred to the first selector 32a.

The first selector 32a receives the encrypted data from one of the encryption arithmetic circuits 25a–c. In addition, the first selector 32a receives a control signal from the internal processor 20 to select the encrypted data from the selected one of the encryption arithmetic circuits 25a–c and deliver it to the second selector 32b.

The second selector 32b receives the encrypted data from the first selector 32a and also receives data read directly from the DRAM 14. In response to a further control signal from the internal processor 20, the second selector 32b selects either one of the encrypted data or the data from the DRAM 14, and transfers the selected data to the personal computer 15.

As discussed above, according to the third embodiment, a plurality of different types of encrypted data are produced by the encryption arithmetic circuits 25a–c, thus enabling a variety of encryption algorithm to be utilized.

To produce encrypted data which are distinct from each other by the individual encryption arithmetic circuits 25a–c, the encryption arithmetic circuits 25a–c may employ distinct encryption procedures rather than employing distinct cipher data. In such instance, the encryption arithmetic circuits 25a–c may receive the same or distinct cipher data.

It should be apparent to those skilled in the art that the present invention may be embodied in many other specific forms without departing from the spirit or scope of the invention.

For example, although the invention has been embodied in a DVD unit in the described embodiments, the invention may be embodied as any signal processor which may apply an arithmetic operation such as multiplying a quantitative value such as a coefficient to the data stored in the DRAM 14 or which may repeat such an arithmetic operation before transfer to an external unit. In such instance, the cipher generator circuit 14 is replaced by a data generator circuit which produces data representing a quantitative value such as a coefficient. In addition, the encryption arithmetic circuits 25 and 25a–c are replaced by an arithmetic circuit which performs an arithmetic operation between data within the DRAM 14 and the quantitative value. Again, the signal processor achieves a similar effect as achieved by the described embodiments.

In the described embodiments, the DVD controller 11 is embodied as a single chip semiconductor integrated circuit, however, it may be embodied into a single chip semiconductor integrated circuit for a portion thereof which excludes at least some of the cipher generator circuit 24 and the encryption arithmetic circuits 25 and 25a–c. The cipher generator circuit 24 and the encryption arithmetic circuits 25 and 25a–c may be formed by a single chip semiconductor integrated circuit, which is separate from the DVD controller 11. The cipher generator circuit 24 may be embodied as a single chip semiconductor integrated circuit. In addition, the cipher generator circuit 24 may be provided externally of the DVD controller 11 and cipher data may be delivered from the cipher generator circuit 24 to the controller 11. Furthermore, the cipher generator circuit 24 may be provided externally of the DVD unit 10, and the cipher data may be delivered from the external cipher generator circuit 24 to the DVD unit 10.

Therefore, the present examples and embodiments are to be considered as illustrative and not restrictive and the invention is not to be limited to the details given herein, but may be modified within the scope and equivalence of the appended claims.

What is claimed is:

1. A signal processor, comprising:
   a memory for storing data to be transferred;
   an encryption arithmetic circuit for successively receiving the data to be transferred from the memory and for successively encrypting the data using cipher data to produce encrypted data;
   an interface for receiving the encrypted data directly from the encryption arithmetic circuit and successively transferring the encrypted data to an external unit;

a control circuit for producing a first control signal which controls the encryption arithmetic circuit;

a cipher generator circuit which produces a cipher data in accordance with the first control signal and delivers the cipher data to the encryption arithmetic circuit; and at least one additional encryption arithmetic circuit, wherein each encryption arithmetic circuit produces encrypted data of as distinct type, and wherein the interface comprises a selector which receives encrypted data of distinct types form the respective encryption arithmetic circuits and selects one of the encrypted data.

2. A digital video disk unit for reading data recorded in an optical disk, comprising:

a memory for storing data to be transferred which is read from the optical disk;

a signal processor for processing the data to be transferred; and a control unit for controlling the signal processor, wherein the signal processor comprises:

an encryption arithmetic circuit which successively receives the data to be transferred from the memory and successively encrypts the data using cipher data to produce encrypted data; and an interface which receives the encrypted data directly from the encryption arithmetic circuit and successively transfers the encrypted data to an external unit.

3. The digital video disk unit according to claim 2, wherein the signal processor further comprises a control circuit which produces a first control signal for controlling the encryption arithmetic circuit.

4. The digital video disk unit according to claim 3, wherein the signal processor further comprises at least one additional encryption arithmetic circuit, and wherein each encryption arithmetic circuit produces encrypted data of a distinct type.

5. A digital video disk unit for reading data recorded in an optical disk, comprising:

a memory for storing data to be transferred which is read from the optical disk;

a signal processor for processing the data to be transferred; and a control unit for controlling the signal processor, wherein the signal processor comprises:

an encryption arithmetic circuit which successively receives the data to be transferred from the memory and successively encrypts the data using cipher data to produce encrypted data;

an interface which receives the encrypted data directly from the encryption arithmetic circuit and successively transfers the encrypted data to an external unit;

a control circuit which produces a first control signal for controlling the encryption arithmetic circuit; and at least one additional encryption arithmetic circuit wherein each encryption arithmetic circuit produces encrypted data of a distinct type and is connected to a cipher generator circuit that produces cipher data of a distinct type and which is delivered to the respective connected encryption arithmetic circuits.

6. A digital video disk unit for reading data recorded in an optical disk, comprising:

a memory for storing data to be transferred which is read from the optical disk;

a signal processor for processing the data to be transferred; and a control unit for controlling the signal processor, wherein the signal processor comprises:

an encryption arithmetic circuit which successively receives the data to be transferred from the memory and successively encrypt the data using cipher data to produce encrypted data;

an interface which receives the encrypted data directly from the encryption arithmetic circuit and successively transfers the encrypted data to an external unit;

a control circuit which produces a first control signal for controlling the encryption arithmetic circuit; and at least one additional encryption arithmetic circuit, wherein each encryption arithmetic circuit produces encrypted data of a distinct type, and wherein the interface comprises a selector which receives the encrypted data of a distinct type from the respective encryption arithmetic circuits and selects one of encrypted data.

* * * * *